US007150448B1

United States Patent
Swift

(10) Patent No.: US 7,150,448 B1
(45) Date of Patent: Dec. 19, 2006

(54) FISH TAPE HAVING ELECTRICAL BOX LOCATOR CIRCUIT AND METHOD THEREFOR

(76) Inventor: Richard C. Swift, 243 Fife St., Henderson, NV (US) 89015

( * ) Notice: Subject to any disclaimer, the term of this patent is extended or adjusted under 35 U.S.C. 154(b) by 0 days.

(21) Appl. No.: 11/254,039

(22) Filed: Oct. 19, 2005

(51) Int. Cl.
  *B66F 3/00* (2006.01)
  *H02G 1/08* (2006.01)
(52) U.S. Cl. .................... 254/134.3 FT; 254/134.3 R
(58) Field of Classification Search ....... 254/134.3 FT, 254/134.3 R, 134.4
  See application file for complete search history.

(56) References Cited

U.S. PATENT DOCUMENTS

| 4,917,362 | A | * | 4/1990 | Wilson ................ 254/134.3 FT |
| 5,110,092 | A | * | 5/1992 | Blaha et al. ......... 254/134.3 FT |
| 6,722,603 | B1 | * | 4/2004 | Atencio .................... 242/390.8 |
| 7,025,333 | B1 | * | 4/2006 | Gianturco ........... 254/134.3 FT |
| 2006/0065883 | A1 | * | 3/2006 | Radle et al. ........ 254/134.3 FT |

* cited by examiner

*Primary Examiner*—Lee D. Wilson
(74) *Attorney, Agent, or Firm*—Jeffrey D. Moy; Harry M. Weiss; Weiss & Moy P.C.

(57) ABSTRACT

A fish tape assembly has a fish tape. A housing is provided for storing the fish tape. A location indicator circuit is coupled to a first end of the fish tape. The location indicator circuit being used to send a location signal indicating a location of the first end of the fish tape.

20 Claims, 2 Drawing Sheets

FISH TAPE HAVING ELECTRICAL BOX LOCATOR CIRCUIT AND METHOD THEREFOR

FIELD OF THE INVENTION

The present invention relates to electrical wire installation and, more specifically, to a fish tape device having a location circuit coupled thereto for helping an individual locate an electrical box located within a wall where the end of the fish tape is located.

BACKGROUND OF THE INVENTION

When installing electrical wire in a home or office building, a fish tape is generally used. A fish tape is an elongated wire member made of tempered spring steel, stainless steel, multi-stranded steel wire, nylon, or the like. The elongated wire member of the fish tape is rigid enough to be pushed through a conduit yet flexible enough to bend around corners or curves in the conduit. After the tape has been "fished" or threaded through a conduit, a wire or cable is attached to the end of the fish tape and the tape is pulled back through the conduit, drawing the wire with it to install the wire in the conduit.

In general, when installing electrical wiring, the fish tape is fed through the conduit starting at or adjacent to a main electrical panel. The fish tape extends through the conduit until it reaches the end of the pathway. In general, an electrical box/junction box is found at the end of the pathway. The fish tape is then tied around or connected to the leading end of one or more electrical wires. The fish tape is then pulled back in the reversed direction, out of the conduit, simultaneously dragging the wire(s) through the conduit.

A problem exists in that in many wire installations in new or existing buildings, the conduit pathway may be fairly long. Many times the electrician will not know where the pathway ends and where the electrical box/junction box housing the leading end of the fish tape is located. Furthermore, the electrical box/junction box may be hidden in the wall thus making it difficult for the electrician to find the electrical box/junction box where the end of the fish tape is located without cutting numerous holes in the wall.

Therefore, a need existed to provide a device to overcome the above problem. The device would allow a person to easily locate the end of the fish tape when the fish tape reaches the end of a pathway.

SUMMARY OF THE INVENTION

In accordance with one embodiment of the present invention, it is an object of the present invention to provide an improved fish tap assembly.

It is another object of the present invention to provide an improved fish tape assembly that would allow a person to easily locate the end of the fish tape when the fish tape reaches the end of a pathway.

BRIEF DESCRIPTION OF THE EMBODIMENTS

In accordance with one embodiment of the present invention a fish tape assembly is disclosed. The fish tape assembly has a fish tape. A housing is provided for storing the fish tape. A location indicator circuit is coupled to a first end of the fish tape. The location indicator circuit being used to send a location signal indicating a location of the first end of the fish tape.

In accordance with another embodiment of the present invention a fish tape assembly is disclosed. The fish tape assembly has a fish tape. A housing is provided for storing the fish tape. The housing has a first outer shell. A second outer shell is coupled to the first outer shell to form a hollow interior section for storing the fish tape. A location indicator circuit is coupled to a first end of the fish tape to send a location signal indicating a location of the first end of the fish tape. The location indicator circuit has a sound chip for generating a location signal. A speaker is coupled to the sound chip for converting the location signal to an audible sound for locating the first end of the fish tape.

In accordance with another embodiment of the present invention a fish tape assembly is disclosed. The fish tape assembly has a fish tape. A housing is provided for storing the fish tape. The housing has a first outer shell. A second outer shell is coupled to the first outer shell to form a hollow interior section for storing the fish tape. A location indicator circuit is coupled to a first end of the fish tape to send a location signal indicating a location of the first end of the fish tape. The location indicator circuit has a transmitting circuit for sending out a location signal. A receiving circuit is used for receiving the location signal and measuring a strength of the location signal.

The present invention is best understood by reference to the following detailed description when read in conjunction with the accompanying drawings.

BRIEF DESCRIPTION OF THE DRAWINGS

Common reference numerals are used throughout the drawings and detailed description to indicate like elements.

DETAILED DESCRIPTION

Figure 1:
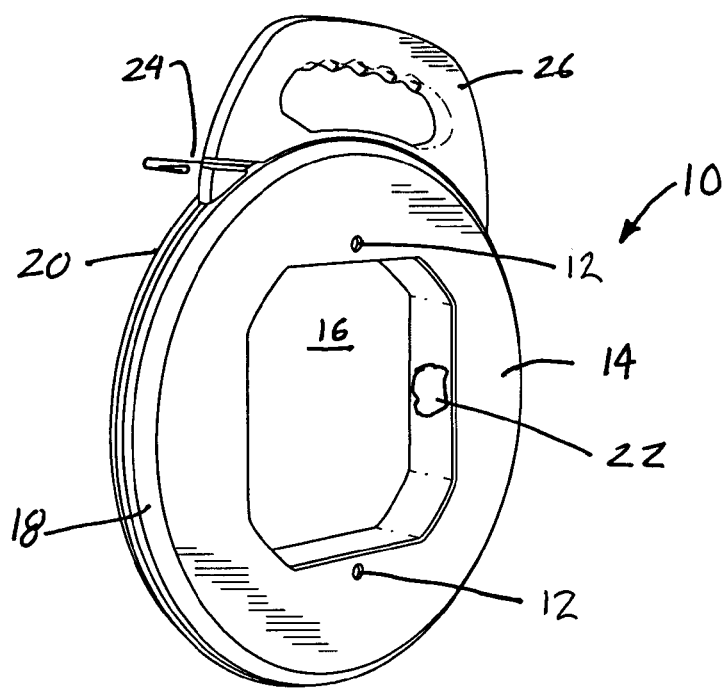
FIG. 1 is a perspective view of a prior art fish tape.

Referring to FIG. 1, a prior art fish tape reel assembly 10 is shown. The fish tape reel assembly 10 generally comprises an outer housing 14. The outer housing 14 is generally circular in shape with an opening 16 formed in a central area of the outer housing 14. The outer housing 14 is generally made up of two halves, 18 and 20, which are coupled together with a plurality of connectors 12 spaced around the outer periphery of the outer housing 14. The two housing halves 18 and 20 form an interior chamber 22.

The interior chamber 22 is used to enclose and store a fish tape 24. The fish tape 24 may be wound around the interior chamber 22. Alternatively, the interior chamber 22 may house a fish tape cassette (not shown) which would be rotatably mounted in the interior chamber 22, and contain the fish tape 24.

A handle 26 may be coupled to the outer housing 14. The handle 26 allows one to firmly grasp the outer housing 14 when removing the fish tape 24 from the interior chamber 22. In some prior art designs, the handle 26 pivots between a locked position and an unlocked position. In the unlocked position, a user rotates the outer housing 14 to deploy or retrieve the fish tape 24. In the locked position, the user can pull on the carrying handle 24 to exert a significant pulling force on the deployed fish tape 24.

Figure 2:
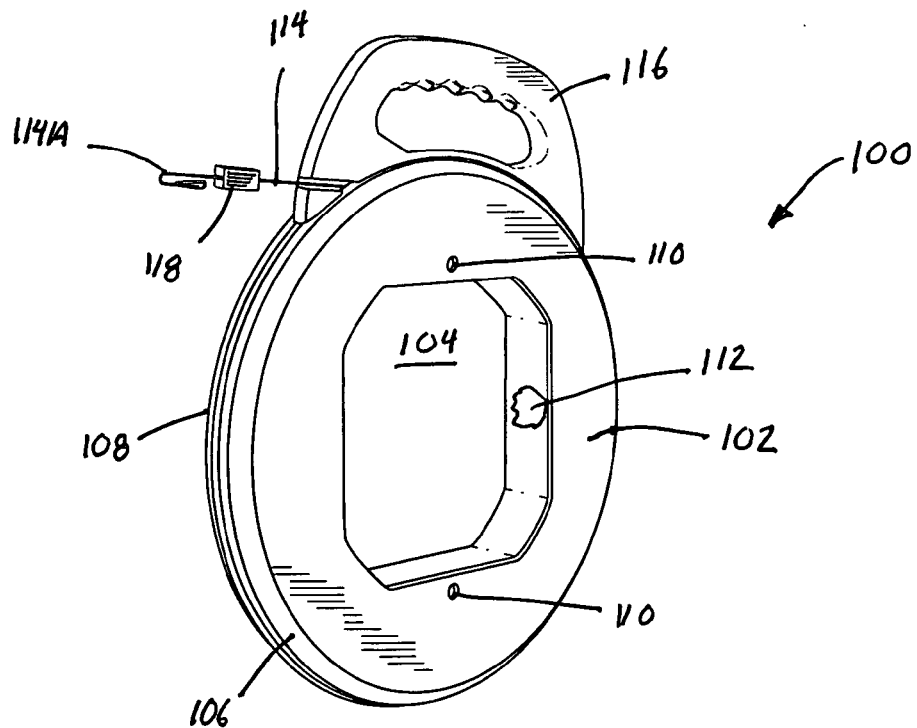
FIG. 2 is a perspective view of the fish tape of the present invention.

Referring to FIG. 2, a fish tape reel assembly 100 of the present invention is shown. The fish tape reel assembly 100 is similar to that shown in FIG. 1. The fish tape reel assembly 100 will have an outer housing 102. The outer housing 102 is generally circular in shape with an opening 104 formed in a central area of the outer housing 102. The outer housing 102 is generally made up of two halves, 106 and 108, which are coupled together with a plurality of connectors 110 spaced around the outer periphery of the outer housing 104. The two housing halves 106 and 108 form an interior chamber 112.

The interior chamber 112 is used to enclose and store a fish tape 114. The fish tape 114 may be wound around the interior chamber 112. Alternatively, the interior chamber 112 may house a fish tape cassette which would be rotatably mounted in the interior chamber 112, and contain the fish tape 114.

A handle 116 may be coupled to the outer housing 102. The handle 116 allows one to firmly grasp the outer housing 102 when removing the fish tape 114 from the interior chamber 112. In accordance with one embodiment of the present invention, the handle 116 pivots between a locked position and an unlocked position. In the unlocked position, a user rotates the outer housing 102 to deploy or retrieve the fish tape 114. In the locked position, the user can pull on the carrying handle 116 to exert a significant pulling force on the deployed fish tape 114.

The fish tape reel assembly 100 will have a location indicator circuit 118 coupled to a first end 114A of the fish tape 114. The location indicator circuit 118 will allow one to locate the first end 114A of the fish tape 114. The location indicator circuit 118 will send out a signal which will allow one to easily locate the first end 114A of the fish tape 114. This will be extremely beneficial when the first end 114A of the fish tape 114 is inserted into a conduit and reaches the end of a desired pathway.

Figure 3:
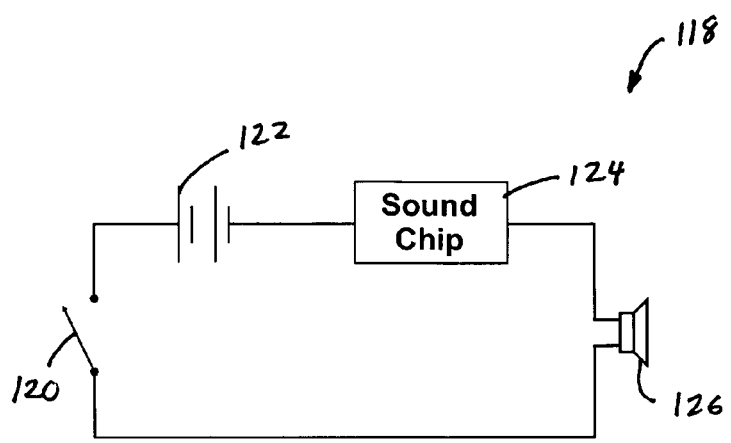
FIG. 3 is a simplified diagram of one embodiment of a locating circuit used in the fish tape of the present invention.
Figure 4:
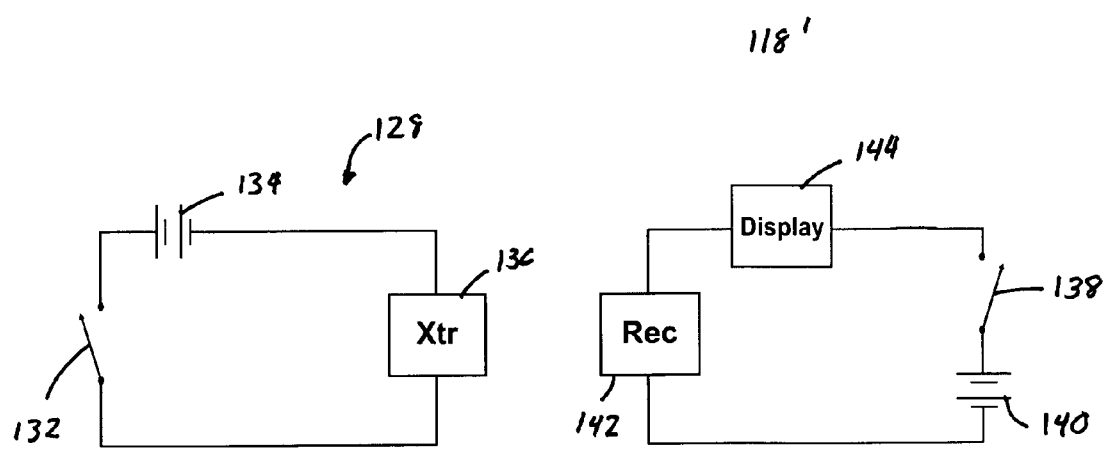
FIG. 4 is a simplified diagram of another embodiment of a locating circuit used in the fish tape of the present invention.

Referring to FIG. 3, one embodiment of the location indicator circuit 118 is shown. The location indicator circuit 118 has a switch 120. The switch 120 is used to activate and deactivate the location indicator circuit 118. A power supply 122 is coupled to the switch 120. The power supply 122 is used to power the location indicator circuit 118. In general, a D.C. power source like a low voltage battery is used. However, other power sources may be used without departing from the spirit and scope of the present invention.

A sound chip 124 is coupled to the power supply 122. The sound chip 124 is used to generate electrical signals which are converted to audible sound signals used to locate the first end 114A of the fish tape 114 where the location indicator circuit 118 is located. The sound chip 124 may be a programmable sound chip 124. The programmable sound chip 124 would allow different sound files to be programmed into the programmable sound chip 124. A speaker 126 is coupled to the sound chip 124. The speaker 126 converts the electrical signals into sound signals and disseminates the sound signals. The speaker 126 may have a volume adjustment switch to adjust the sound level of the sound signals that are being disseminated.

Referring to FIG. 3, another embodiment of the location indicator circuit 118' used in the fish tape reel assembly 100 of the present invention is shown. The location indicator circuit 118' has a transmitting circuit 128 and a receiving circuit 130. The transmitting circuit 128 will send a location signal when activated. The receiving circuit 130 is used to locate the transmitting circuit 128. The receiving circuit 130 will measure the strength of the location signal transmitted by the transmitting circuit 128. The stronger the signal indicating the closer the receiving circuit 130 is to the transmitting circuit 128.

The transmitting circuit 128 will have a switch 132. The switch 132 is used to activate and deactivate the transmitting circuit 128. A power supply 134 is coupled to the switch 132.

The power supply 134 is used to power the transmitting circuit 128. In general, a D.C. power source like a low voltage battery is used. However, other power sources may be used without departing from the spirit and scope of the present invention. A transmitter 136 is coupled to the power supply 134. The transmitter 136 will send a location signal of a predetermined frequency when the transmitting circuit 128 is activated.

As stated above, the receiving circuit 130 will measure the strength of the location signal transmitted by the transmitting circuit 128. The stronger the signal indicating the closer the receiving circuit 130 is to the transmitting circuit 128. The receiving circuit 130 will have a switch 138. The switch 138 is used to activate and deactivate the receiving circuit 130. A power supply 140 is coupled to the switch 138. The power supply 140 is used to power the receiving circuit 130. In general, a D.C. power source like a low voltage battery is used.

However, other power sources may be used without departing from the spirit and scope of the present invention. A receiver 142 is coupled to the power supply. The receiver 142 is used to receive the location signal sent by the transmitting circuit 128. A display 144 is coupled to the receiver 142. The display 144 is used to indicate the strength of the signal received by the receiver 142. The display 144 may be a liquid crystal display (LCD), light emitting diode (LED) display, or the like. The listing of the above are given as examples and should not be seen as to limit the scope of the present invention.

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process may be implemented by one of skill in the art in view of this disclosure.

What is claimed is:

1. A fish tape assembly comprising:
 a fish tape;
 a housing for storing the fish tape; and
 a location indicator circuit coupled to a first end of the fish tape to send a location signal indicating a location of the first end of the fish tape.

2. A fish tape assembly in accordance with claim 1 wherein the location indicator circuit comprises:
 a sound chip for generating a location signal; and
 a speaker coupled to the sound chip for converting the location signal to an audible sound for locating the first end of the fish tape.

3. A fish tape assembly in accordance with claim 2 wherein the location indicator circuit further comprises a power supply coupled to the sound chip.

4. A fish tape assembly in accordance with claim 3 wherein the location indicator circuit further comprises a switch coupled to the power supply for activating and deactivating the location indicator circuit.

5. A fish tape assembly in accordance with claim 1 wherein the location indicator circuit comprises:

a transmitting circuit for sending out a location signal; and a receiving circuit for receiving the location signal and measuring a strength of the location signal.

6. A fish tape assembly in accordance with claim 5 wherein the transmitting circuit comprises a transmitter for sending out the location signal.

7. A fish tape assembly in accordance with claim 6 wherein the transmitting circuit further comprises a power supply coupled to the transmitter.

8. A fish tape assembly in accordance with claim 7 wherein the transmitting circuit further comprises a switch coupled to the power supply for activating and deactivating the transmitting circuit.

9. A fish tape assembly in accordance with claim 5 wherein the receiving circuit comprises a receiver for receiving the location signal sent by the transmitting circuit.

10. A fish tape assembly in accordance with claim 9 wherein the receiving circuit further comprises a display for showing a strength of the location signal received by the receiving circuit.

11. A fish tape assembly in accordance with claim 10 wherein the receiving circuit further comprises a power supply coupled to the receiver.

12. A fish tape assembly in accordance with claim 11 wherein the receiving circuit further comprises a switch coupled to the power supply for activating and deactivating the receiving circuit.

13. A fish tape assembly in accordance with claim 1 wherein the housing comprises:

a first outer shell; and a second outer shell coupled to the first outer shell to form a hollow interior section for storing the fish tape.

14. A fish tape assembly in accordance with claim 1 wherein the fish tape assembly further comprises a handle coupled to the housing.

15. A fish tape assembly comprising:

a fish tape;

a housing for storing the fish tape comprising:

a first outer shell; and a second outer shell coupled to the first outer shell to form a hollow interior section for storing the fish tape; and a location indicator circuit coupled to a first end of the fish tape to send a location signal indicating a location of the first end of the fish tape, wherein the location indicator circuit comprises:

a sound chip for generating a location signal; and a speaker coupled to the sound chip for converting the location signal to an audible sound for locating the first end of the fish tape.

16. A fish tape assembly in accordance with claim 15 wherein the location indicator circuit further comprises a power supply coupled to the sound chip.

17. A fish tape assembly in accordance with claim 16 wherein the location indicator circuit further comprises a switch coupled to the power supply for activating and deactivating the location indicator circuit.

18. A fish tape assembly comprising:

a fish tape;

a housing for storing the fish tape comprising:

a first outer shell; and a second outer shell coupled to the first outer shell to form a hollow interior section for storing the fish tape; and a location indicator circuit coupled to a first end of the fish tape to send a location signal indicating a location of the first end of the fish tape, wherein the location indicator circuit comprises:

a transmitting circuit for sending out a location signal; and a receiving circuit for receiving the location signal and measuring a strength of the location signal.

19. A fish tape assembly in accordance with claim 18 wherein the transmitting circuit comprises:

a transmitter for sending out the location signal;

a power supply coupled to the transmitter; and a switch coupled to the power supply for activating and deactivating the transmitting circuit.

20. A fish tape assembly in accordance with claim 18 wherein the receiving circuit comprises:

a receiver for receiving the location signal sent by the transmitting circuit;

a display for showing a strength of the location signal received by the receiving circuit;

a power supply coupled to the receiver; and a switch coupled to the power supply for activating and deactivating the receiving circuit.

* * * * *